United States Patent
Takabatake et al.

(10) Patent No.: US 6,536,229 B1
(45) Date of Patent: Mar. 25, 2003

(54) ABSORPTION REFRIGERATOR

(75) Inventors: Syuzo Takabatake, Otsu (JP);
Kunihiko Nakajima, Otsu (JP);
Osamu Ohishi, Kusatsu (JP); Kenichi Saitou, Funabashi (JP); Masuomi Ohta, Moriyama (JP)

(73) Assignee: Kawasaki Thermal Engineering Co., Ltd., Shiga (JP)

( * ) Notice: Subject to any disclaimer, the term of this patent is extended or adjusted under 35 U.S.C. 154(b) by 43 days.

(21) Appl. No.: 09/763,628

(22) PCT Filed: Aug. 29, 2000

(86) PCT No.: PCT/JP00/05839
§ 371 (c)(1),
(2), (4) Date: Mar. 6, 2001

(87) PCT Pub. No.: WO02/18849
PCT Pub. Date: Mar. 7, 2002

(51) Int. Cl.[7] .................................................. F25B 15/00
(52) U.S. Cl. .............................. 62/476; 62/481; 62/112; 62/101
(58) Field of Search ........................... 62/476, 481, 112, 62/101

(56) References Cited

U.S. PATENT DOCUMENTS

| | | | |
|---|---|---|---|
| 3,796,045 A | * | 3/1974 | Foster-Pegg ............... 60/39.02 |
| 4,009,575 A | * | 3/1977 | Hartman, Jr. et al. ......... 60/648 |
| 4,296,085 A | * | 10/1981 | Banquy ..................... 423/359 |
| 4,470,269 A | * | 9/1984 | Takemi et al. ............. 62/235.1 |
| 5,447,042 A | * | 9/1995 | Ohuchi et al. ............... 62/476 |
| 5,517,830 A | * | 5/1996 | Ohuchi et al. ............... 62/476 |
| 5,964,103 A | * | 10/1999 | Mabuchi et al. .............. 62/476 |
| 6,038,882 A | * | 3/2000 | Kuroda et al. ............... 62/476 |

FOREIGN PATENT DOCUMENTS

| | | |
|---|---|---|
| JP | 6-257878 | 9/1994 |
| JP | 2000-154945 | 6/2000 |
| JP | 2000-154946 | 6/2000 |
| JP | 2000-205691 | 7/2000 |
| JP | 2000-249422 | 9/2000 |
| WO | 02/18849 | 3/2002 |

* cited by examiner

*Primary Examiner*—William C. Doerrler
*Assistant Examiner*—Mark Shulman
(74) *Attorney, Agent, or Firm*—Rader, Fishman & Grauer PLLC

(57) ABSTRACT

A steam type absorption refrigerator which circulates absorption fluid from an absorber (1), through a low-temperature heat exchanger (3), a low-temperature regenerator (4), a high-temperature heat exchanger (6), a steam heating type high-temperature regenerator (7), the high-temperature heat exchanger (6) and the low-temperature heat exchanger (3) in order, back to the absorber (1) comprising, a fluid concentrating boiler (10) which is disposed between the high-temperature regenerator (7) and the high-temperature heat exchanger (6) concentrating the absorption fluid under heat, and a pump (13) which extracts a part or all of the concentrated absorption fluid from the high-temperature regenerator (7) and feeds it to the fluid concentrating boiler (10), wherein the fluid concentrating boiler is connected to the high-temperature heat exchanger (6) so that the absorption fluid concentrated under heat is returned to the heating side of the high-temperature heat exchanger (6) and is also connected to the high-temperature regenerator (7) so that refrigerant steam generated from the absorption fluid at the fluid concentrating boiler is fed as a heating source to the high-temperature regenerator (7).

16 Claims, 12 Drawing Sheets

F I G . 1
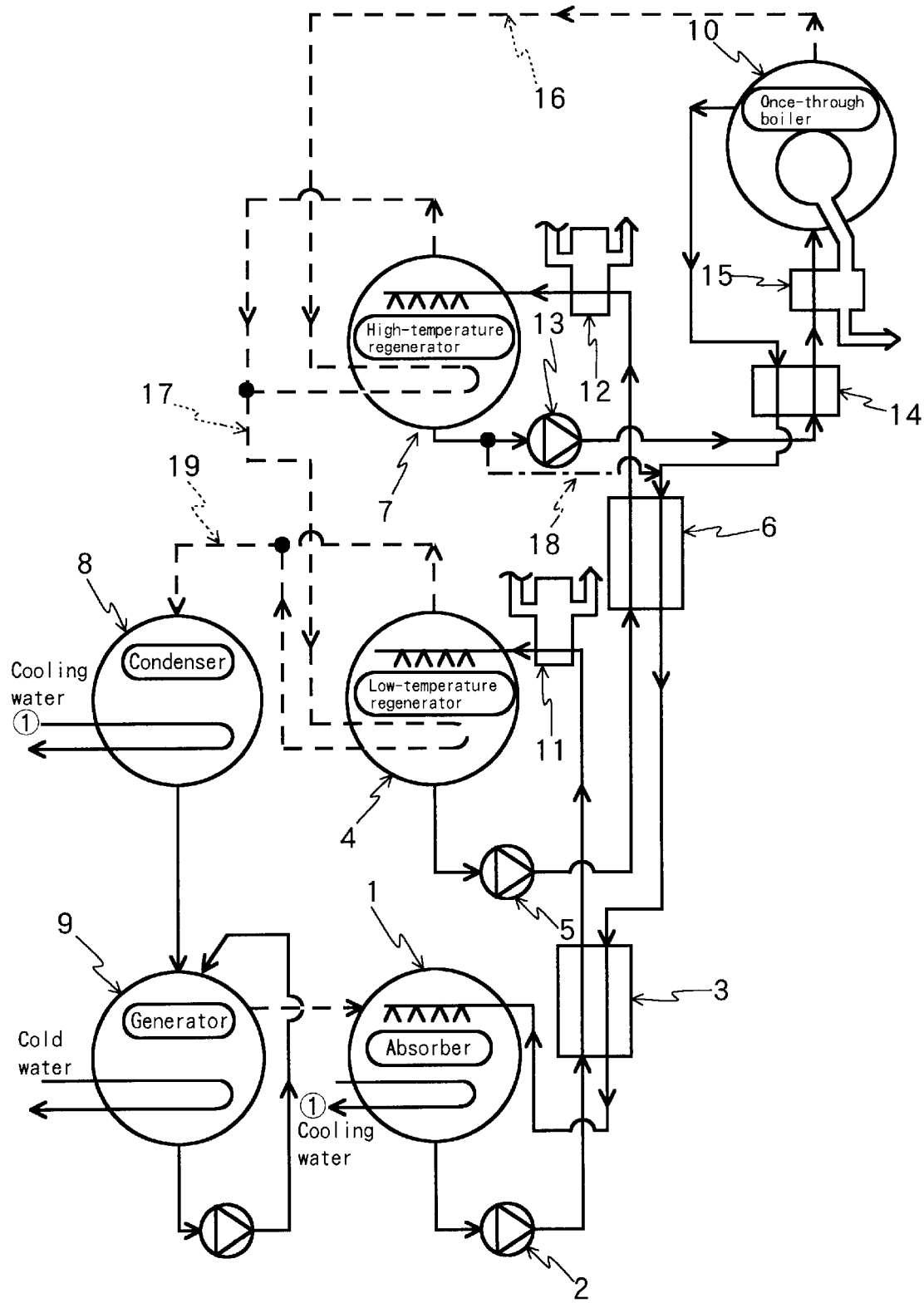

ABSORPTION REFRIGERATOR

TECHNICAL FIELD

The present invention relates to an absorption refrigerator. More particularly, the invention relates to an absorption refrigerator combined with a fluid concentrating boiler in the form of one body for a steam type double-effect absorption refrigerator of so-called reverse cycle type and parallel cycle type. Here, it is to be understood that the absorption refrigerator includes an absorption water cooling/heating device.

BACKGROUND ART

Conventionally, an apparatus as shown in FIG. 11 has been well known as a steam type double-effect absorption refrigerator. Such apparatus forms a reverse cycle in which an absorption fluid is fed to a high-temperature regenerator e from an absorber a through a low-temperature regenerator c. The absorption cycle in the apparatus is here described.

First, an absorption fluid (rare absorption fluid) lowered in concentration by absorbing a large volume of refrigerant steam in the absorber a is fed from the absorber a to a low-temperature heat exchanger b, in which the rare absorption fluid is heated by the low-temperature heat exchanger b, and then the absorption fluid is fed to the low-temperature regenerator c. The rare absorption fluid is regenerated under low-temperature at the low-temperature regenerator c and discharges a part of the absorbed refrigerant, resulting in increasing in concentration to become an absorption fluid of intermediate concentration (intermediate absorption fluid). Next, the intermediate absorption fluid is fed from the low-temperature regenerator c to the high-temperature heat exchanger d, in which the absorption fluid is heated by the high-temperature heat exchanger d, and then the absorption fluid is fed to the high-temperature regenerator e.

The intermediate absorption fluid is regenerated under high-temperature at the high-temperature regenerator e and discharges a part of the absorbed refrigerant, further increasing in concentration to become an absorption fluid of high concentration (concentrated absorption fluid). And, the concentrated absorption fluid is returned, as a heating source for heating the intermediate absorption fluid, to the heating side of the high-temperature heat exchanger d, and further returned, as a heating source for heating the rare absorption fluid, to the heating side of the low-temperature heat exchanger b, and then returned to the absorber a. The returned concentrated absorption fluid is sprayed at the absorber a and, while being cooled by cooling water, again absorbs the refrigerant steam to become the rare absorption fluid.

In FIG. 11, the marks f and g represent for a steam boiler and a condenser respectively.

Also, conventionally, an apparatus as shown in FIG. 12 has been well known as a steam type double-effect absorption refrigerator. Such apparatus forms a parallel cycle in which an absorption fluid is parallel-fed from an absorber a to both of low-temperature regenerator c and high-temperature regenerator e. The circulation cycle in the apparatus is described in the following.

First, an absorption fluid (rare absorption fluid) lowered in concentration by absorbing a large volume of refrigerant steam in the absorber a is fed from the absorber a to the low-temperature heat exchanger b, and the rare absorption fluid, after being heated by the low-temperature heat exchanger b, is branched into two directions. One of the branched fluid is fed to the low-temperature regenerator c via a medium-temperature heat exchanger h and is regenerated under low-temperature at the low-temperature regenerator c, and then returned to the heating side of low-temperature heat exchanger b via the heating side of medium-temperature heat exchanger d. The other fluid is fed to the high-temperature regenerator e via the high-temperature heat exchanger d, the fluid is regenerated under high-temperature at the high-temperature regenerator e, and then returned to the low-temperature heat exchanger b via the heating side of the high-temperature heat exchanger d.

The absorption fluid increased in concentration by discharging a part of the refrigerant absorbed by regeneration at the low-temperature regenerator c and high-temperature regenerator e are joined together before being fed to the low-temperature heat exchanger b, and the absorption fluid is passed to the heating side of low-temperature heat exchanger b, and then returned to the absorber a. The returned concentrated absorption fluid is sprayed at the absorber a and, while being cooled by cooling water, again absorbs the refrigerant steam to become the rare absorption fluid.

In such steam type double-effect absorption refrigerators of reverse cycle type and parallel cycle type, a high-temperature steam is fed as a heating source from the steam boiler f to the high-temperature regenerator e, and the intermediate absorption fluid is heated by the steam and discharges the absorbed refrigerant, and the discharged refrigerant steam is used as a heating source at the low-temperature regenerator c, and then returned to the condenser g to be condensed.

However, such steam type double-effect absorption refrigerator combined with the steam boiler f involves the following problems.

The steam boiler f itself is very large in size and makes the absorption refrigerator large-sized as a whole. Further, for the operation of the steam boiler f it is necessary to install separate systems for water feed, recovery of after-heating steam drain, injection of chemicals, etc. besides the absorption refrigerator. This contradicts the energy saving concept and further gives rise to getting larger in size of the refrigeration system as stated above since additional equipment is required therefor. Nevertheless, the role played by the steam boiler f for the absorption refrigerator is only feeding of the heating source and it is hard to say that the resultant effect is commensurate with the fuel consumed for the combustion at the steam boiler f. In addition, it is necessary to have qualified persons and to receive inspections, etc. for the operation of the boiler in accordance with the law.

The present invention has been made in order to solve these problems of the prior art, and the object of the invention is to provide an absorption refrigerator capable of achieving the reduction of the fuel consumption per cooling output and energy saving by using the boiler function fully, and further to provide a compact absorption refrigerator in total with easy operation.

DISCLOSURE OF THE INVENTION

The first aspect of the absorption refrigerator of the present invention is an absorption refrigerator which circulates absorption fluid from an absorber, through a low-temperature heat exchanger, a low-temperature regenerator, a high-temperature heat exchanger, a steam heating type high-temperature regenerator, the high-temperature heat exchanger and the low-temperature heat exchanger in order, back to the absorber comprising:

a fluid concentrating boiler which is disposed between the high-temperature regenerator and the high-temperature heat exchanger concentrating the absorption fluid under heat, and a feed means which extracts a part or all of the concentrated absorption fluid from the high-temperature regenerator and feeds it to the fluid concentrating boiler, wherein the fluid concentrating boiler is connected to the high-temperature heat exchanger so that the absorption fluid concentrated under heat is returned to the heating side of the high-temperature heat exchanger and is also connected to the high-temperature regenerator so that refrigerant steam generated from the absorption fluid at the fluid concentrating boiler is fed as a heating source to the high-temperature regenerator.

The second aspect of the absorption refrigerator of the present invention is an absorption refrigerator in which absorption fluid, first fed from an absorber to a low-temperature heat exchanger, is branched into two passages, one leading to a low-temperature regenerator via a medium-temperature heat exchanger and the other leading to a steam heating type high-temperature regenerator via a high-temperature heat exchanger, and the absorption fluid regenerated at the low-temperature regenerator is returned to the heating side of the medium-temperature heat exchanger, while the absorption fluid regenerated at the high-temperature regenerator is returned to the heating side of the high-temperature heat exchanger, and these absorption fluid from the medium-temperature heat exchanger and the high-temperature heat exchanger are joined together and returned to the absorber through the heating side of the low-temperature heat exchanger comprising:

a fluid concentrating boiler which is disposed between the high-temperature regenerator and the high-temperature heat exchanger and concentrates the absorption fluid under heat, and a feed means which extracts a part or all of the concentrated absorption fluid from the high-temperature regenerator and feeds same to the fluid concentrating boiler, wherein the fluid concentrating boiler is connected to the high-temperature heat exchanger so that the absorption fluid concentrated under heat is returned to the heating side of the high-temperature heat exchanger and is also connected to the high-temperature regenerator so that refrigerant steam generated from the absorption fluid at the fluid concentrating boiler is fed as a heating source to the high-temperature regenerator.

The third aspect of the absorption refrigerator of the present invention is an absorption refrigerator in which absorption fluid, first fed from an absorber to a low-temperature heat exchanger, is branched into two passages, one leading to a low-temperature regenerator and the other leading to a steam heating type high-temperature regenerator via a high-temperature heat exchanger, and the absorption fluid regenerated at the low-temperature regenerator and the absorption fluid regenerated at the high-temperature regenerator and passed through the high-temperature heat exchanger are joined together and returned to the absorber through the heating side of the low-temperature heat exchanger comprising:

a fluid concentrating boiler which is disposed between the high-temperature regenerator and the high-temperature heat exchanger and concentrates the absorption fluid under heat, and a feed means which extracts a part or all of the concentrated absorption fluid from the high-temperature regenerator and feeds same to the fluid concentrating boiler, wherein the fluid concentrating boiler is connected to the high-temperature heat exchanger so that the absorption fluid concentrated under heat is returned to the heating side of the high-temperature heat exchanger and is also connected to the high-temperature regenerator so that refrigerant steam generated from the absorption fluid at the fluid concentrating boiler is fed as a heating source to the high-temperature regenerator.

In the absorption refrigerator of the present invention, it is possible to comprise a first heat exchanger of which heating source is a return absorption fluid returned from the outlet side of the fluid concentrating boiler to the high-temperature heat exchanger, wherein a feed absorption fluid fed from the high-temperature regenerator undergoes heat exchange with the return absorption fluid at the first heat exchanger before being fed to the fluid concentrating boiler.

Further, in the absorption refrigerator of the present invention, it is possible to comprise a second heat exchanger of which heating source is the combustion exhaust gas of the fluid concentrating boiler, wherein the feed absorption fluid fed from the high-temperature regenerator undergoes heat exchange with the combustion exhaust gas at the second heat exchanger before being fed to the fluid concentrating boiler.

Still further, in the absorption refrigerator of the present invention, it is possible that the second heat exchanger is an economizer applied to the fluid concentrating boiler, and that the feed absorption fluid is heated by the economizer.

Still further, in the absorption refrigerator of the first aspect of the present invention, it is possible that an auxiliary regenerator of which heating source is the combustion exhaust gas of the fluid concentrating boiler is disposed at the inlet side of the absorption fluid to the low-temperature regenerator in the range from the low-temperature heat exchanger to the low-temperature regenerator, and/or at the inlet side of the absorption fluid to the high-temperature regenerator in the range from the high-temperature heat exchanger to the high-temperature regenerator; in the absorption refrigerator of the second aspect of the present invention, it is possible that an auxiliary regenerator of which heating source is the combustion exhaust gas of the fluid concentrating boiler is disposed at the inlet side of the absorption fluid to the low-temperature regenerator in the range from the medium-temperature heat exchanger to the low-temperature regenerator, and/or at the inlet side of the absorption fluid to the high-temperature regenerator in the range from the high-temperature heat exchanger to the high-temperature regenerator; in the absorption refrigerator of the third aspect of the present invention, it is possible that an auxiliary regenerator of which heating source is the combustion exhaust gas of the fluid concentrating boiler is disposed at the inlet side of the absorption fluid to the low-temperature regenerator in the range from the absorption fluid branch point to the low-temperature regenerator, and/or at the inlet side of the absorption fluid to the high-temperature regenerator in the range from the high-temperature heat exchanger to the high-temperature regenerator.

Still further, in the absorption refrigerator of the present invention, it is possible that a third heat exchanger that heats rare absorption fluid by using the refrigerant drain of the low-temperature regenerator as a heating source is disposed in parallel with the low-temperature heat exchanger or in series at the outlet side of the absorption fluid of the low-temperature heat exchanger.

Still further, in the absorption refrigerator of the present invention, it is possible that a fourth heat exchanger that heats intermediate absorption fluid by using as a heating source the refrigerant drain of the low-temperature regenerator is disposed in parallel with the high-temperature heat exchanger or in series at the outlet side of the absorption fluid of the high-temperature heat exchanger.

Still further, in the absorption refrigerator of the first aspect of the present invention, it is possible that a part of the absorption fluid is bypassed from the upstream side of an intermediate fluid feed means to a absorption fluid return line between the high-temperature heat exchanger and the low-temperature heat exchanger.

Still further, in the absorption refrigerator of the present invention, it is possible to provide a plurality of combinations of absorber and generator, wherein cold water, cooling water and absorption fluid are series-fed to the plurality of combinations; or it is possible to provide a plurality of combinations of absorber and generator, wherein cold water and absorption fluid are series-fed to the plurality of combinations and further cooling water is parallel-fed to the plurality of combinations.

Still further, in the absorption refrigerator of the present invention, it is possible that cooling water is fed from the condenser to the absorber.

Still further, in the absorption refrigerator of the present invention, it is preferable that the fluid concentrating boiler is a once-through boiler.

The absorption refrigerator of the invention has a configuration as described above and is in no need of providing any particular water feeding system for the boiler and requires no recovery of steam drain. Also, it is not necessary to have a chemical injection device, enabling the miniaturization of the boiler. Consequently, the boiler can be integrated into the absorption refrigerator.

BRIEF DESCRIPTION OF THE DRAWINGS

FIG. 1 is a schematic drawing of example 1 of the invention.

BEST MODE FOR CARRING OUT OF THE INVENTION

Figure 2:
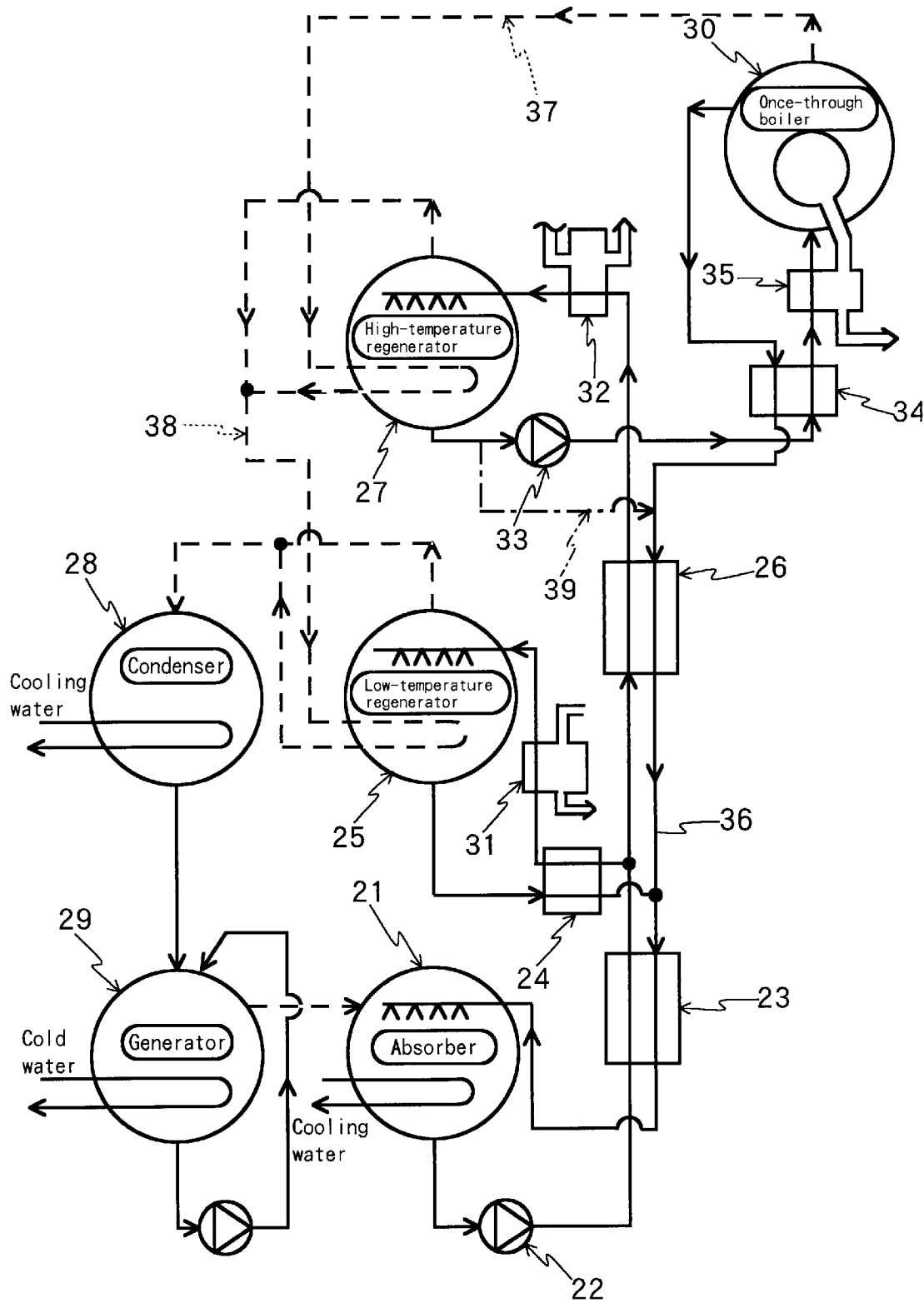
FIG. 2 is a schematic drawing of example 2 of the invention.

Hereinafter the present invention is described in accordance with embodiments, however, it is to be understood that the invention is not limited in its application to only these embodiments.

The present invention is basically made reduce fuel consumption per cooling output by feeding the boiler with absorption fluid in place of water and using the boiler for concentrating the absorption fluid, and, at the same time, use the resultant refrigerant steam discharged as heating sources of the high-temperature regenerator, etc.

Specifically, the first embodiment of the invention is a steam type absorption refrigerator in which absorption fluid is circulated from an absorber, through a low-temperature heat exchanger, a low-temperature regenerator, a high-temperature heat exchanger, a steam heating type high-temperature regenerator, the high-temperature heat exchanger and the low-temperature heat exchanger in order, back to the absorber, and the absorption refrigerator comprises a fluid concentrating boiler which is disposed between the high-temperature regenerator and the high-temperature heat exchanger concentrates the absorption fluid under heat, and a feeding means, a pump for example, which extracts a part or all of the concentrated absorption fluid from the high-temperature regenerator and feeds same to the fluid concentrating boiler; wherein the fluid concentrating boiler is connected to the high-temperature heat exchanger so that the absorption fluid concentrated under heat is to be returned to the heating side of the high-temperature heat exchanger, and is also connected to the high-temperature regenerator so that refrigerant steam generated from the absorption fluid at the fluid concentrating boiler is to be fed as a heating source to the high-temperature regenerator.

Also, the second embodiment of the invention is a steam type absorption refrigerator in which absorption fluid, first fed from an absorber to a low-temperature heat exchanger, is branched into two passages, one leading to a low-temperature regenerator via a medium-temperature heat exchanger and the other leading to a steam heating type high-temperature regenerator via a high-temperature heat exchanger, and the absorption fluid regenerated at the low-temperature regenerator is returned to the heating side of the medium-temperature heat exchanger, while the absorption fluid regenerated at the high-temperature regenerator is returned to the heating side of the high-temperature heat exchanger, and these absorption fluid from the medium-temperature heat exchanger and the high-temperature heat exchanger are joined together and returned to the absorber through the heating side of the low-temperature heat exchanger, and the absorption refrigerator comprises a fluid concentrating boiler which is disposed between the high-temperature regenerator and the high-temperature heat exchanger and concentrates the absorption fluid under heat, and a feed means, a pump for example, which extracts a part or all of the concentrated absorption fluid from the high-temperature regenerator and feeds same to the fluid concentrating boiler. And the fluid concentrating boiler is connected to the high-temperature heat exchanger so that the absorption fluid concentrated under heat is to be returned to the heating side of the high-temperature heat exchanger and is also connected to the high-temperature regenerator so that refrigerant steam generated from the absorption fluid at the fluid concentrating boiler is to be fed as a steam heating source to the high-temperature regenerator.

Also, the third embodiment of the invention is a steam type absorption refrigerator in which absorption fluid, first fed from an absorber to a low-temperature heat exchanger, is branched into two passages, one leading to a low-temperature regenerator and the other leading to a steam heating type high-temperature regenerator via a high-temperature heat exchanger, and the absorption fluid regenerated at the low-temperature regenerator and the absorption fluid regenerated at the high-temperature regenerator and passed through the high-temperature heat exchanger are joined together and returned to the absorber through the heating side of the low-temperature heat exchanger, and the absorption refrigerator comprises a fluid concentrating boiler which is disposed between the high-temperature regenerator and the high-temperature heat exchanger and concentrates the absorption fluid under heat, and a feed means, a pump for example, which extracts a part or all of the concentrated absorption fluid from the high-temperature regenerator and feeds same to the fluid concentrating boiler. And the fluid concentrating boiler is connected to the high-temperature heat exchanger so that the absorption fluid concentrated under heat is to be returned to the heating side of the high-temperature heat exchanger and is also connected to the high-temperature regenerator so that refrigerant steam generated from the absorption fluid at the fluid concentrating boiler is to be fed as a steam heating source to the high-temperature regenerator.

Here, as a "fluid concentrating boiler", it is enough to be an apparatus which is provided with a function to heat concentrated absorption fluid by combustion of a fuel, a function to discharge the absorbed refrigerant as refrigerant steam, and a durable function against the interior pressures generated during heating of the concentrated absorption fluid.

In the case of the present invention, the concentrated absorption fluid further concentrated from the intermediate absorption fluid regenerated at high temperatures by the high-temperature regenerator is fed to the fluid concentrating boiler by a pump, and then the fluid is furthermore concentrated by the fluid concentrating boiler. The highly concentrated absorption fluid, that is, the absorption fluid heated at high temperatures is returned to be used as the heating source of the high-temperature heat exchanger and then as the heating source of the low-temperature heat exchanger. On the other hand, at the fluid concentrating boiler, refrigerant is discharged as refrigerant steam during concentration of absorption fluid, and the refrigerant steam is fed as the heating source of the high-temperature regenerator. Thus, the high-temperature regeneration at the high-temperature regenerator is efficiently performed.

In this way, by combining the absorption refrigerator with a fluid concentrating boiler, it becomes possible to reduce the fuel consumption per cooling output as a whole, and at the same time, it becomes possible to achieve the power and energy saving purpose. Such effect is obtained, qualitatively, irrespective of the volumes of the concentrated absorption fluid which is fed to the fluid concentrating boiler from the high-temperature regenerator.

Furthermore, in the present invention, unlike a conventional steam boiler, it is unnecessary to provide water feed, chemical injection and steam drain recovery, and therefore, no corresponding equipment is required, so that the whole absorption refrigerator can be made compact and no corresponding energy is required, whereby it will lead to remarkable power and energy saving.

Also, in the present invention, it is possible to add the following configuration from the viewpoint of improving the heat efficiency, particularly the efficiency of the fluid concentrating boiler.

That is, it is possible to comprise a first heat exchanger for heat exchanging between the feed absorption fluid fed from the high-temperature regenerator to the fluid concentrating boiler and the return absorption fluid returned from the fluid concentrating boiler to the high-temperature heat exchanger. In this case, the feed absorption fluid increases in temperature receiving the heat from the return absorption fluid heated at high temperatures at the first heat exchanger, and the feed absorption fluid increased in temperature is fed to the fluid concentrating boiler, thereby improving the boiler efficiency as compared with the case of not having the heat exchanger. Also, it is possible to comprise a second heat exchanger for heat exchanging between the feed absorption fluid fed from the high-temperature regenerator to the fluid concentrating boiler and the combustion exhaust gas discharged from the fluid concentrating boiler.

As the second heat exchanger, it is possible to apply, for example, an economizer disposed at the fluid concentrating boiler and let the feed absorption fluid flow through the economizer. In case of such second heat exchanger installed, the feed absorption fluid increased in temperature at the second heat exchanger is fed to the fluid concentrating boiler, thereby the boiler efficiency is improved as compared with the case of not having the second heat exchanger. Further, in this case, it becomes possible to achieve power and energy saving since the combustion gas of the fluid concentrating boiler itself is used as the heat source for increasing the temperature of the feed absorption fluid.

Furthermore, it is possible to add the following configuration from the viewpoint of energy saving.

Firstly, in the first embodiment of the invention, it is possible to dispose an auxiliary regenerator (heat exchanger), of which heating source is the combustion gas of the fluid concentrating boiler, at the inlet of absorption fluid to the low-temperature regenerator in the range from the low-temperature heat exchanger to the low-temperature regenerator and/or at the inlet of absorption fluid to the high-temperature regenerator in the range from the high-temperature heat exchanger to the high-temperature regenerator.

Also, in the second and third embodiments of the invention, it is possible to dispose the auxiliary regenerator (heat exchanger) at the inlet of absorption fluid to the low-temperature regenerator in the range from the medium-temperature heat exchanger to the low-temperature regenerator or in the range from the absorption fluid branch point to the low-temperature regenerator and/or dispose at the inlet of absorption fluid to the high-temperature regenerator in the range from the high-temperature heat exchanger to the high-temperature regenerator.

In these cases, since a part of the quantity of heat per cooling output can be covered by the combustion exhaust gas, it becomes possible to reduce the quantity of heat as compared with the case of not having the auxiliary regenerator, thereby achieving the energy saving purpose.

Secondly, it is possible to dispose a third heat exchanger, which utilizes the refrigerant drain of the low-temperature regenerator as a heating source, and heats rare absorption fluid, in parallel with the low-temperature heat exchanger or in series with the outlet side of the rare absorption fluid of the low-temperature heat exchanger. In this case, since a part of the quantity of heat per cooling output that must be externally fed can be covered by the refrigerant drain, it becomes possible to reduce the quantity of heat as compared with the case of not having the third heat exchanger, thereby achieving the energy saving purpose.

Thirdly, it is possible to dispose a fourth heat exchanger, which utilizes the refrigerant drain of the high-temperature regenerator as a heating source, and heats the intermediate absorption fluid, in parallel with the high-temperature heat exchanger or in series with the outlet side of the intermediate absorption fluid of the high-temperature heat exchanger. In this case, since a part of the quantity of heat per cooling output that must be externally heated can be covered by the refrigerant drain, it becomes possible to reduce the quantity of heat as compared with the case of not having the fourth heat exchanger, thereby achieving the energy saving purpose.

Fourthly, in the first embodiment of the invention, it is possible to bypass a part of the intermediate absorption fluid to the absorption fluid return line between the high-temperature heat exchanger and the low-temperature heat exchanger from the upstream side of intermediate fluid pump (intermediate fluid feeding means). In this case, since the quantity of lithium bromide fed to the higher temperature side can be decreased, and therefore the quantity of heat loss generated at the high temperature side is reduced, thereby improving the heat efficiency and achieving the purposes such as prevention of cavitation of rare fluid pump and reduction of noise.

Fifthly, it is possible to provide a plurality of combinations of absorber and generator and to series-feed cold water, cooling water and absorption fluid to the plurality of combinations or to provide a plurality of combinations of absorber and generator and to series-feed the cold water and absorption fluid to the plurality of combinations and further to parallel-feed the cooling water to these plurality of combinations. In this case, the internal pressure of the absorber and the internal pressure of the generator can be changed per group, making it possible to use the absorption fluid in a range of lower concentrations than in the prior art, thereby improving the efficiency and enabling considerable miniaturization of the high-temperature regenerator and the heat exchanger. Consequently, the absorption refrigerator can be greatly reduced in size.

Sixthly, it is allowable that cooling water flows from a condenser to an absorber. In this case, the increase in temperature and pressure at the high temperature system or boiler system, which is the disadvantage of an absorption refrigerator having a plurality of regenerators, is controlled at relatively low levels. That is, since the temperature and pressure of the condenser become decreased, the temperature of the low-temperature regenerator is lowered, and the temperature of the high-temperature regenerator is also lowered, thereby the temperature and pressure of the boiler are decreased.

In the present invention, from the viewpoint of simplifying the operation, it is also possible to employ a once-through boiler as the fluid concentrating boiler. In this case, the total volume of absorption fluid is decreased due to reduction in volume of the absorption fluid kept in the boiler. Accordingly, it becomes possible to reduce the cost since lithium of the absorption fluid is expensive. Further, when the heat transfer area is 10 $m^2$ or less, the boiler is ranked as a miniature boiler, and when the heat transfer area is 5 $m^2$ or less, it is ranked as a simplified boiler. Therefore, no qualified persons for the operation and no permission for the installation are required, and the regulations for inspections, etc. are relieved.

In the following, the present invention is described in accordance with the examples with reference to the appended drawings, but it is to be understood that the invention is not limited in its application to only these examples.

EXAMPLE 1

FIG. 1 shows an absorption refrigerator of example 1 of the present invention. The example 1 is an absorption refrigerator combined with a once-through boiler 10 that serves as a fluid concentrating boiler for a double-effect absorption refrigerator of reverse cycle type comprising an absorber 1, a pump (rare fluid pump) 2, a low-temperature heat exchanger 3, a low-temperature regenerator 4, a pump (intermediate fluid pump) 5, a high-temperature heat exchanger 6, a high-temperature regenerator 7, a condenser 8 and a generator 9. That is, in the example 1, the double-effect absorption refrigerator and the fluid concentrating boiler 10 are built into the refrigeration cycle of absorption fluid in the form of one body. And, the example 1 is additionally provided with auxiliary regenerators 11, 12, a pump (concentrated fluid pump) 13, an additional heat exchanger 14 as a first heat exchanger, and an economizer 15 as a second heat exchanger, besides the fluid concentrating boiler 10. In FIG. 1, the arrow attached to a real line represents the flow direction of absorption fluid or refrigerant, and the arrow attached to a broken line shows the flow direction of refrigerant steam.

The absorption fluid circulation cycle is described in the following in order. First, a rare absorption fluid lowered in concentration by absorbing a large volume of refrigerant steam in the absorber 1 is fed by the rare fluid pump 2 from the absorber 1 to the low-temperature heat exchanger 3, in which the rare absorption fluid is heated, thereafter the absorption fluid is fed to the low-temperature regenerator 4. The rare absorption fluid is further heated by the auxiliary regenerator 11 stated later before being fed to the low-temperature regenerator 4, and the heated fluid is then fed to the low-temperature regenerator 4. The rare absorption fluid is low-regenerated at the low-temperature regenerator 4 and discharges a part of the absorbed refrigerant, thereby increasing in concentration to become an intermediate absorption fluid of intermediate concentrations.

Next, the intermediate absorption fluid is fed by the intermediate fluid pump 5 from the low-temperature regenerator 4 to the high-temperature heat exchanger 6, in which the intermediate absorption fluid is heated, thereafter the intermediate absorption fluid is fed to the high-temperature regenerator 7. The intermediate absorption fluid is further heated by the auxiliary regenerator 12 before being fed to the high-temperature regenerator 7, the same as in the case of before being fed to the low-temperature regenerator 4, and the heated fluid is fed to the high-temperature regenerator 7. The intermediate absorption fluid is high-regenerated at the high-temperature regenerator 7 and discharges a part of the absorbed refrigerant, thereby further increasing in concentration to become a concentrated absorption fluid of high concentrations.

Further, the concentrated absorption fluid is fed by the concentrated fluid pump 13 from the high-temperature regenerator 7 to the once-through boiler 10, in which the absorption fluid is further heated and discharges the absorbed refrigerant as refrigerant steam, thereby increasing in concentration to become a highly concentrated absorption fluid.

Before being fed to the once-through boiler 10, the concentrated absorption fluid is first heated by the additional heat exchanger 14, and then is heated by the economizer 15. That is, in the additional heat exchanger 14, the concentrated absorption fluid fed by the concentrated absorption fluid pump 13 is concentrated by the once-through boiler 10, and then the fluid is heated through heat exchange with the highly concentrated absorption fluid returned to the high-temperature heat exchanger 6. Also, in the economizer 15, the concentrated absorption fluid heated by the additional heat exchanger 14 is further heated through heat exchange with the combustion exhaust gas discharged from the once-through boiler 10.

The highly concentrated absorption fluid high-concentrated by the once-through boiler 10 is first led to the heating side of the additional heat exchanger 14 and then led to the heating side of the high-temperature heat exchanger 6 to heat the intermediate absorption fluid, thereafter the highly concentrated absorption fluid is led to the heating side of the low-temperature heat exchanger 3 to heat the rare absorption fluid, and then returned to the absorber 1. At the absorber 1, the returned highly concentrated absorption fluid is sprayed and cooled by cooling water, whereby it absorbs a large volume of refrigerant steam fed from the generator 9 and again turns into a rare absorption fluid.

On the other hand, the refrigerant steam generated at the once-through boiler 10 is fed as a steam heat source to the high-temperature regenerator 7 through the pipe 16 and is utilized for high temperature regeneration of the intermediate absorption fluid at the high-temperature regenerator 7. And the refrigerant steam utilized at the high-temperature regenerator 7 goes into the pipe 17. Also, the refrigerant steam discharged from the high-temperature regenerator 7 is fed as a heating source to the low-temperature regenerator 4. In this way, the refrigerant steam utilized for heating goes into the pipe 19 and then is fed to the condenser 8, and it is condensed by cooling water to become a refrigerant.

The combustion exhaust gas discharged from the once-through boiler 10 is passed through the economizer 15 and then fed as a heating source to the two auxiliary regenerators 11, 12. As for the two auxiliary regenerators 11, 12, it is allowable to series-feed the combustion exhaust gas from the auxiliary regenerator 12 to the auxiliary regenerator 11 or to parallel-feed the combustion exhaust gas to both of the auxiliary regenerators 11, 12.

EXAMPLE 2

FIG. 2 shows an absorption refrigerator of example 2 of the present invention. The example 2 is an absorption refrigerator combined with a once-through boiler 30 that serves as a fluid concentrating boiler for a double-effect absorption refrigerator of parallel cycle type comprising; an absorber 21, a pump (rare absorption fluid pump) 22, a low-temperature heat exchanger 23, a medium-temperature heat exchanger 24, a low-temperature regenerator 25, a high-temperature heat exchanger 26, a high-temperature regenerator 27, a condenser 28 and a generator 29. That is, in the example 2, the double-effect absorption refrigerator and the fluid concentrating boiler 30 are built into the refrigeration cycle by absorption fluid in the form of one body. The example 2 is additionally provided with auxiliary regenerators 31, 32, a pump (concentrated absorption fluid pump) 33, an additional heat exchanger 34 as a first heat exchanger, and an economizer 35 as a second heat exchanger, besides the fluid concentrating boiler 30. Incidentally, in FIG. 2, the arrow attached to a real line represents the flow direction of absorption fluid or refrigerant, and the arrow attached to a broken line represents the flow direction of refrigerant steam.

In the following, the absorption fluid circulation cycle is described in order.

First, a rare absorption fluid lowered in concentration by absorbing a large volume of refrigerant steam in the absorber 21 is fed by the rare absorption fluid pump 22 from the absorber 21 to the low-temperature heat exchanger 23, which is branched into the low-temperature regenerator 25 side and the high-temperature regenerator 27 side after being heated by the low-temperature heat exchanger 23.

The rare absorption fluid branched into the low-temperature regenerator 25 side is heated by the medium-temperature heat exchanger 24 and then is fed to the low-temperature regenerator 25. The rare absorption fluid is further heated by the auxiliary regenerator 31 stated later before being fed to the low-temperature regenerator 25 from the medium-temperature heat exchanger 24, and the heated fluid is fed to the low-temperature regenerator 25. The rare absorption fluid is low-regenerated at the low-temperature regenerator 25 and discharges a part of the absorbed refrigerant and as a result increases in concentration to become an intermediate absorption fluid of intermediate concentrations. And the intermediate absorption fluid is returned to the heating side of the medium-temperature heat exchanger 24 coming out of the low-temperature regenerator 25 and after heating the rare absorption fluid at the medium-temperature heat exchanger 24, it is returned to the heating side of the low-temperature heat exchanger 23 and is returned to the pipe 36.

On the other hand, the rare absorption fluid branched into the high-temperature regenerator 27 side is fed to the high-temperature regenerator 27 after being heated by the high-temperature heat exchanger 26. The rare absorption fluid is further heated by the auxiliary regenerator 32 stated later before being fed to the high-temperature regenerator 27 after getting out of the high-temperature heat exchanger 26, and the heated fluid is then fed to the high-temperature regenerator 27. And the rare absorption fluid is high-regenerated at the high-temperature regenerator 27 and discharges a part of the absorbed refrigerant to become a concentrated absorption fluid of relatively high concentrations.

Further, the concentrated absorption fluid is fed by the concentrated absorption fluid pump 33 from the high-temperature regenerator 27 to the once-through boiler 30, which is further heated by the once-through boiler 30 and discharges the absorbed refrigerant as refrigerant steam to become a highly concentrated absorption fluid of still higher concentrations.

Here, before being fed to the once-through boiler 30, the concentrated absorption fluid is first heated by the additional heat exchanger 34 and then is heated by the economizer 35. At the additional heat exchanger 34, the concentrated absorption fluid fed by the concentrated absorption fluid pump 33 is concentrated by the once-through boiler 30 and then heated through heat exchange with highly concentrated absorption fluid returned to the high-temperature heat exchanger 26. Also, at the economizer 35, the concentrated absorption fluid heated by the additional heat exchanger 34 is further heated through heat exchange with the combustion exhaust gas discharged from the once-through boiler 30.

After the highly concentrated absorption fluid high-concentrated by the once-through boiler 30 is led to the heating side of the additional heat exchanger 34, it is fed to the heating side of the high-temperature heat exchanger 26 to heat the rare absorption fluid, and further it is joined with the intermediate absorption fluid from the low-temperature regenerator 25 in the return pipe 36. The highly concentrated absorption fluid joined with the intermediate absorption fluid is led to the heating side of the low-temperature heat exchanger 23 to heat the rare absorption fluid and then returned to the absorber 21. At the absorber 21, the returned highly concentrated absorption fluid and the intermediate absorption fluid are sprinkled and cooled by cooling water, then absorbing a large volume of refrigerant steam fed from the generator 29 to become a rare absorption fluid again.

On the other hand, the refrigerant steam generated at the once-through boiler 30 is fed as a steam heat source to the high-temperature regenerator 27 through the pipe 37 and is utilized for high temperature regeneration of the intermediate absorption fluid at the high-temperature regenerator 27. And the refrigerant steam utilized at the high-temperature regenerator 27 goes into the pipe 38, and the refrigerant steam is fed as a heating source, together with the refrigerant steam discharged from the high-temperature regenerator 27, to the low-temperature regenerator 25 through the pipe 38. Further, the refrigerant steam is fed to the condenser 28 and condensed by cooling water to become a refrigerant.

Also, the combustion exhaust gas discharged from the once-through boiler 30 is passed through the economizer 35 and then is fed as a heating source to each of the two auxiliary regenerators 31, 32. As for the two auxiliary regenerators 31, 32, it is possible to series-feed the combustion exhaust gas from the auxiliary regenerator 32 to the auxiliary regenerator 31 or to parallel-feed the combustion exhaust gas to both of the auxiliary regenerators 31, 32.

EXAMPLE 3

Figure 3:
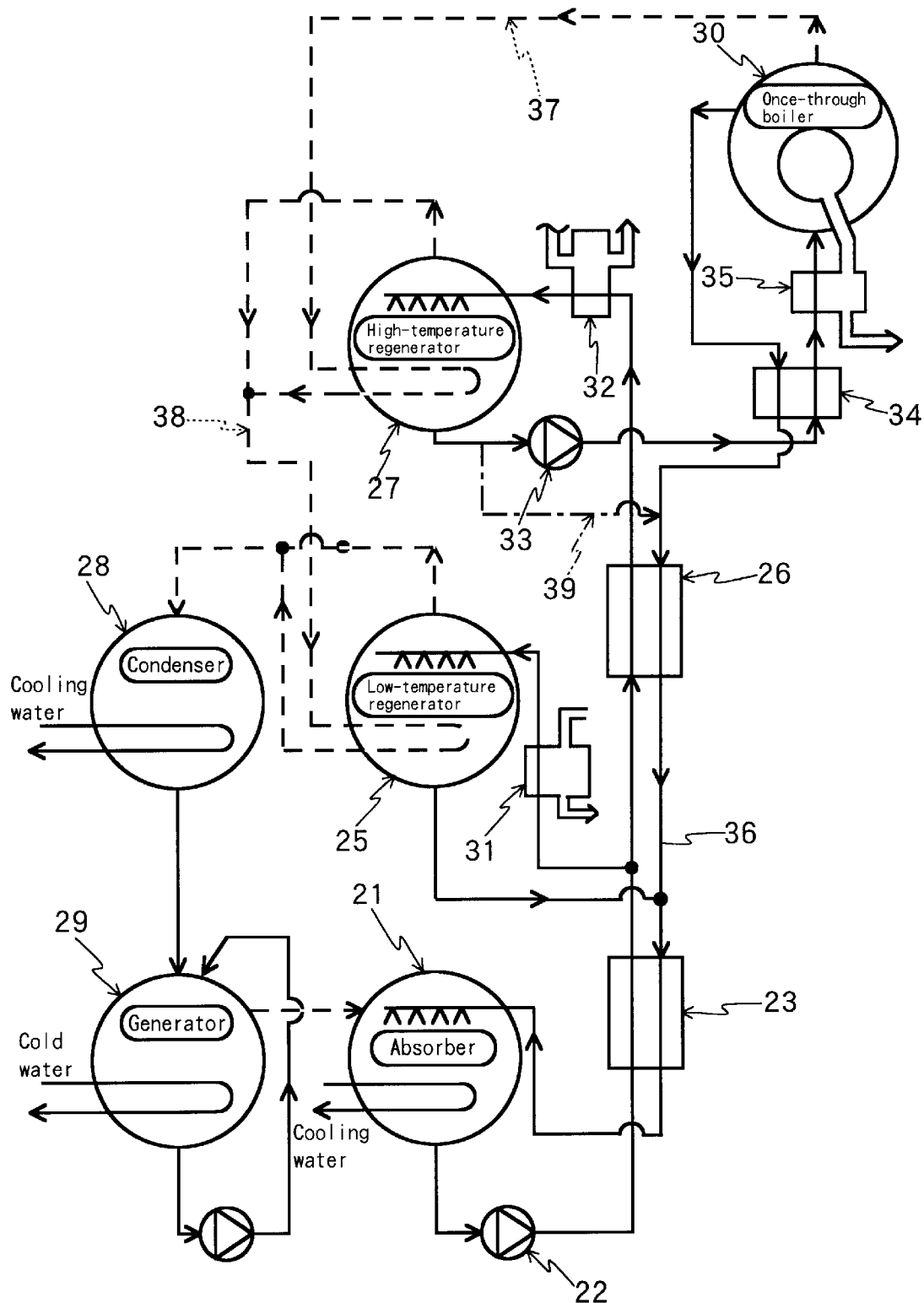
FIG. 3 is a schematic drawing of example 3 of the invention.

FIG. 3 shows an absorption refrigerator of example 3 of the present invention. The example 3 is a modification of the example 2. Specifically, the medium-temperature heat exchanger 24 disposed at the inlet side of the low-temperature regenerator 25 is disused in the example 3. The other components of the example 3 are to be identical with those of the example 2.

In the example 3, the medium-temperature heat exchanger 24 is not installed, causing the heat efficiency to be lowered as a result. However, the configuration is so much simplified making it possible to reduce the cost of the absorption refrigerator.

EXAMPLE 4

Figure 4:
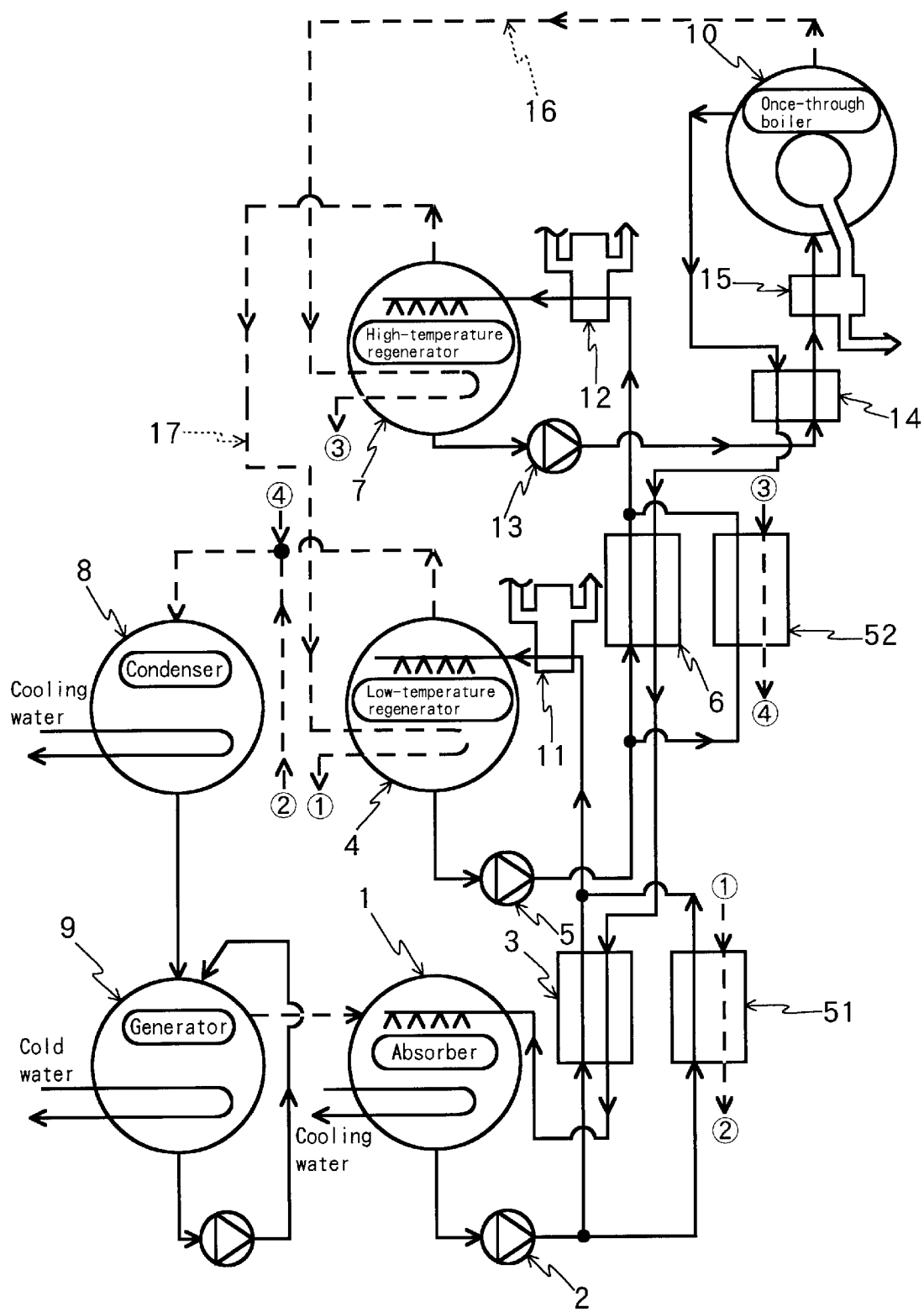
FIG. 4 is a schematic drawing of example 4 of the invention.

The example 4 of the invention is a modification of the example 1. As shown in FIG. 4, there is provided a second low-temperature heat exchanger 51 which heats the rare absorption fluid by the refrigerant drain from the low-temperature regenerator 4 in parallel with the low-temperature heat exchanger 3, and a second high-temperature heat exchanger 52 which heats the intermediate absorption fluid by the refrigerant drain from the high-temperature regenerator 7 in parallel with the high-temperature heat exchanger 6.

In this way, the example 4 having such configuration brings about advantages such that the heat of the refrigerant drain cooled and radiated by cooling water is effectively recovered and used to heat the absorption fluid, thereby achieving the energy saving purpose by reducing the quantity of heat at the once-through boiler.

In the example shown at the figure, the second low-temperature heat exchanger 51 and the second high-temperature heat exchanger 52 are disposed in parallel with the low-temperature heat exchanger 3 and the high-temperature heat exchanger 6 respectively, but it is also possible to dispose the second low-temperature heat exchanger 51 in series with the low-temperature heat exchanger 3 at the rare absorption fluid outlet side of the low-temperature heat exchanger 3 and to dispose the second high-temperature heat exchanger 52 in series with the high-temperature heat exchanger 6 at the intermediate fluid outlet side of the high-temperature heat exchanger 6.

EXAMPLE 5

Figure 5:
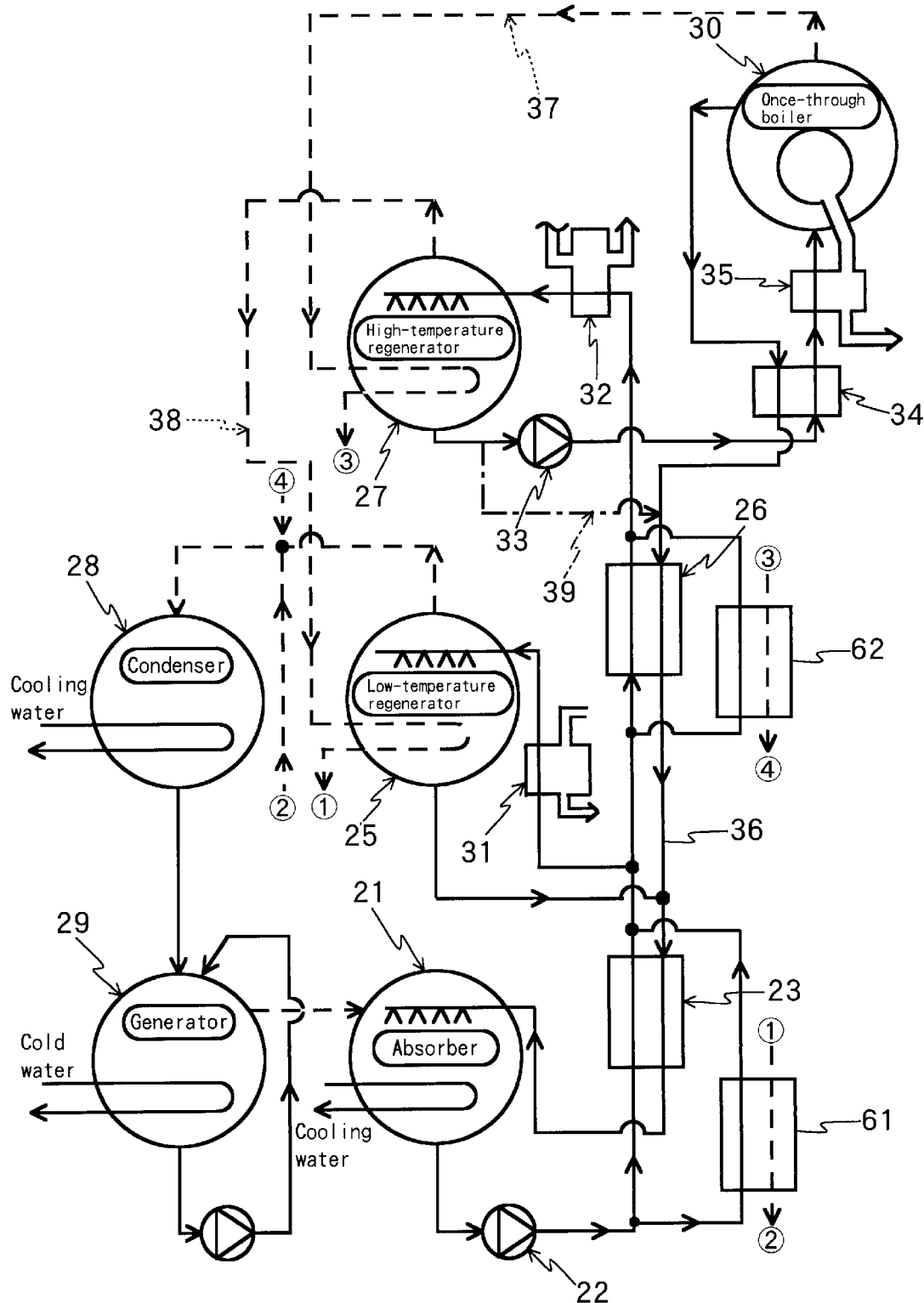
FIG. 5 is a schematic drawing of example 5 of the invention.

The example 5 of the invention is a modification of the example 3. As shown in FIG. 5, there is provided a second low-temperature heat exchanger 61 which heats the rare absorption fluid by the refrigerant drain from the low-temperature regenerator 25 in parallel with the low-temperature heat exchanger 23, and a second high-temperature heat exchanger 62 which heats the intermediate absorption fluid by the refrigerant drain from the high-temperature regenerator 27 in parallel with the high-temperature heat exchanger 26.

In this way, the example 5 having such configuration brings about advantages such that the heat of the refrigerant drain cooled and radiated by cooling water is effectively recovered and used to heat the absorption fluid, thereby achieving the energy saving purpose by reducing the quantity of heat at the once-through boiler.

In the example shown at the figure, the second low-temperature heat exchanger 61 and the second high-temperature heat exchanger 62 are disposed in parallel with the low-temperature heat exchanger 23 and the high-temperature heat exchanger 26 respectively, but it is also possible to dispose the second low-temperature heat exchanger 61 in series with the low-temperature heat exchanger 23 at the rare absorption fluid outlet side of the low-temperature heat exchanger 23 and to dispose the second high-temperature heat exchanger 62 in series with the high-temperature heat exchanger 26 at the intermediate fluid outlet side of the high-temperature heat exchanger 26.

EXAMPLE 6

Figure 6:
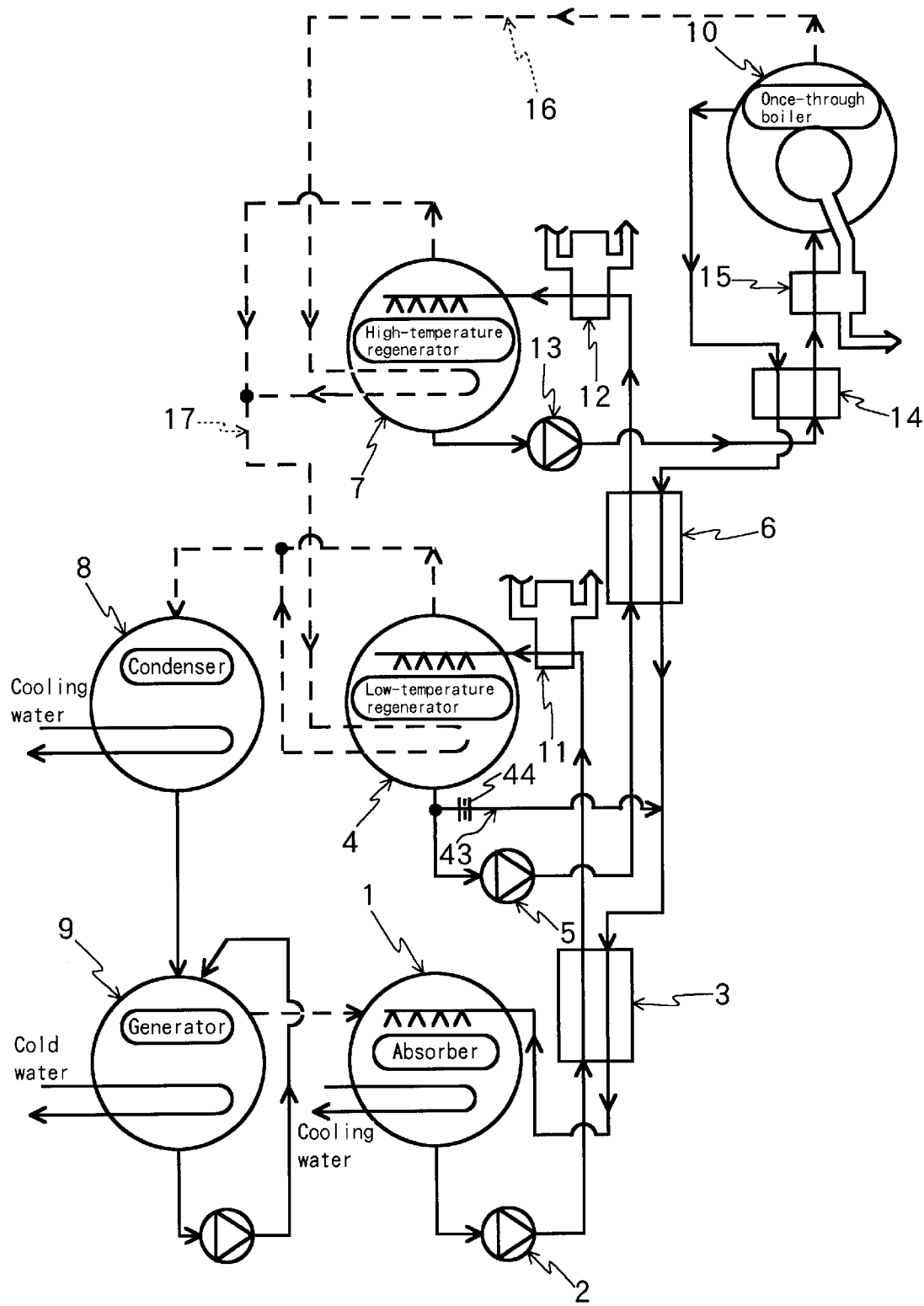
FIG. 6 is a schematic drawing of example 6 of the invention.

The example 6 of the invention is a modification of the example 1. As shown in FIG. 6, a part of the intermediate absorption fluid is fed to the high-temperature regenerator 7 by the intermediate fluid pump 5, and the rest is branched into the pipe 43 from the upstream side of suction side of the intermediate fluid pump 5 and is directly fed to the heating side of the low-temperature heat exchanger 3. That is, the inlet side of intermediate fluid pump 5 and the inlet side of the heating side of low-temperature heat exchanger 3 are communicated by the pipe 43. The flow rate at the branch may be controlled, for example, by orifice 44.

In this way, the example 6 having such configuration brings about advantages such that the quantity of absorption fluid fed to the high temperature side is reduced and the quantity of heat loss generated at the high temperature side is reduced, thereby making it possible to improve the heat efficiency and to prevent the cavitation of rare absorption fluid pump.

EXAMPLE 7

Figure 7:
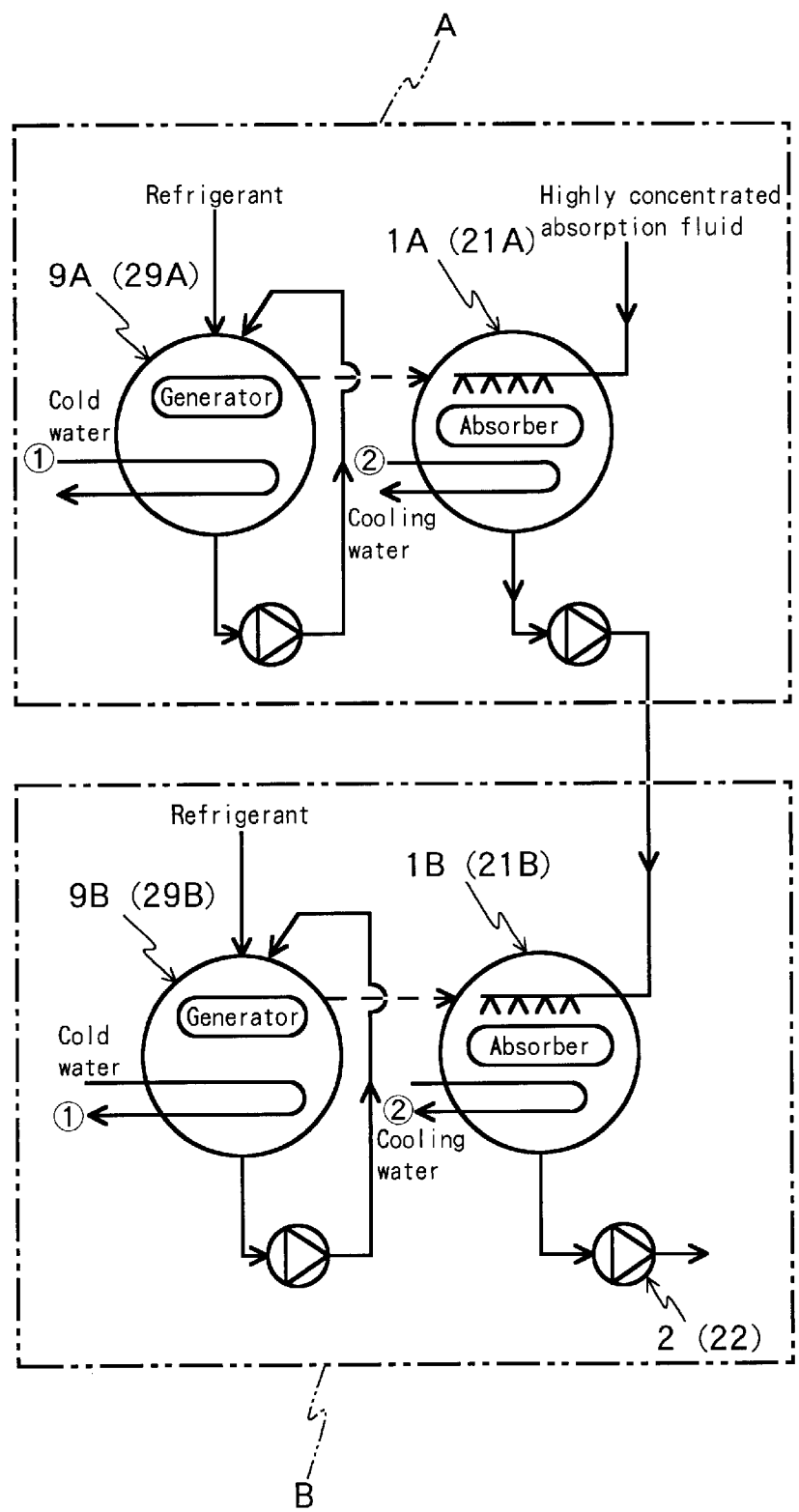
FIG. 7 is a schematic drawing of the main part of example 7 and example 8 of the invention.

The example 7 of the invention is a modification of the example 1. As shown in FIG. 7, there are provided two combinations of absorber 1 and generator 9, that is, a first block A comprising a first absorber 1A and a first generator 9A and a second block B comprising a second absorber 1B and a second generator 9B with respect to the absorber 1 and the generator 9, wherein cold water and cooling water are series-fed from the second block B to the first block A, while highly concentrated absorption fluid is series-fed from the first block A to the second block B.

In this way, the example 7 having such configuration brings about advantages such that the pressure in the absorber 1 and the pressure in the generator 9 can be changed per block, thereby making it possible to utilize the absorption fluid in a wide range of concentrations, namely, even in a range of very low concentrations, reducing the quantity of absorption fluid circulated and enabling the effective use of low temperature heat sources.

EXAMPLE 8

The example 8 of the invention is a modification of the example 2. As shown in FIG. 7, there are provided two combinations of absorber 21 and generator 29, that is, a first block A comprising a first absorber 21A and a first generator 29A and a second block B comprising a second absorber 21B and a second generator 29B with respect to the absorber 21 and the generator 29, wherein cold water and cooling water are series-fed from the second block B to the first block A, while highly concentrated absorption fluid is series-fed from the first block A to the second block B.

In this way, the example 8 having such configuration brings about advantages such that the pressure in the absorber 21 and the pressure of the generator 29 can be changed per block, thereby making it possible to utilize the absorption fluid in a wide range of concentrations, namely, even in a range of very low concentrations, reducing the quantity of absorption fluid circulated and enabling the effective use of low temperature heat sources.

EXAMPLE 9

Figure 8:
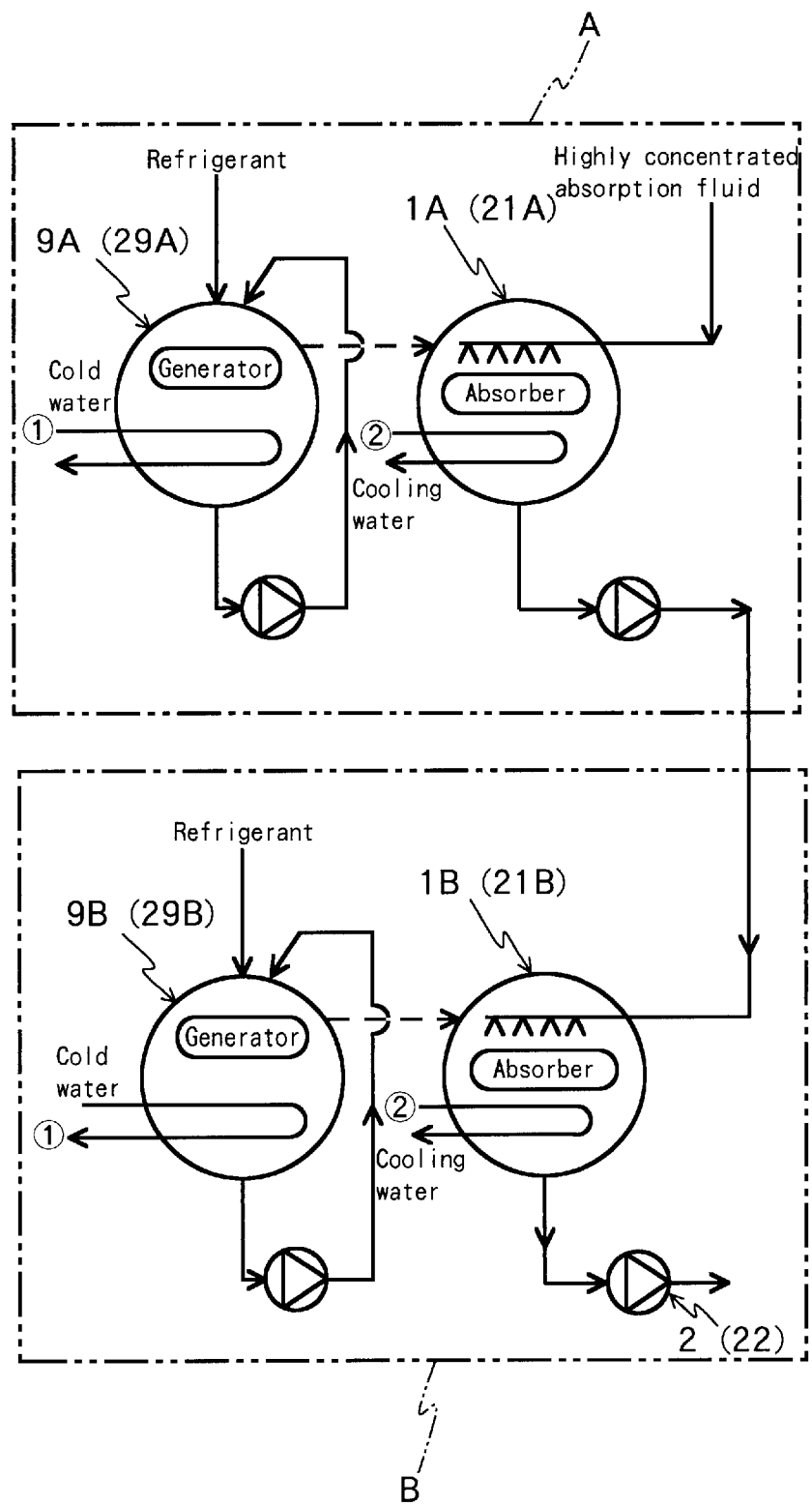
FIG. 8 is a schematic drawing of the main part of example 9 and example 10 of the invention.

The example 9 of the invention is a modification of the example 7. As shown in FIG. 8, there are provided two combinations of absorber 1 and generator 9, that is, a first block A comprising a first absorber 1A and a first generator 9A and a second block B comprising a second absorber 1B and a second generator 9B with respect to the absorber 1 and the generator 9, wherein cold water is series-fed from the second block B to the first block A, highly concentrated absorption fluid is series-fed from the first block A to the second block B, and cooling water is parallel-fed to the first block A and the second block B.

In this way, the example 9 having such configuration brings about advantages such that the pressure in the absorber 1 and the pressure of the generator 9 can be changed per block, thereby making it possible to utilize the absorption fluid in a wide range of concentrations, namely, even in a range of very low concentrations, reducing the quantity of absorption fluid circulated and enabling the effective use of low temperature heat sources.

EXAMPLE 10

The example 10 of the invention is a modification of the example 8. As shown in FIG. 8, there are provided two combinations of absorber 21 and generator 29, that is, a first block A comprising a first absorber 21A and a first generator 29A and a second block B comprising a second absorber 21B and a second generator 29B with respect to the absorber 21 and the generator 29, wherein cold water is series-fed from the second block B to the first block A, highly concentrated absorption fluid is series-fed from the first block A to the second block B, and cooling water is parallel-fed to the first block A and the second block B.

In this way, the example 10 having such configuration brings about advantages such that the pressure in the absorber 21 and the pressure of the generator 29 can be changed per block, thereby making it possible to utilize the absorption fluid in a wide range of concentrations, namely, even in a range of very low concentrations, reducing the quantity of absorption fluid circulated and enabling the effective use of low temperature heat sources.

EXAMPLE 11

Figure 9:
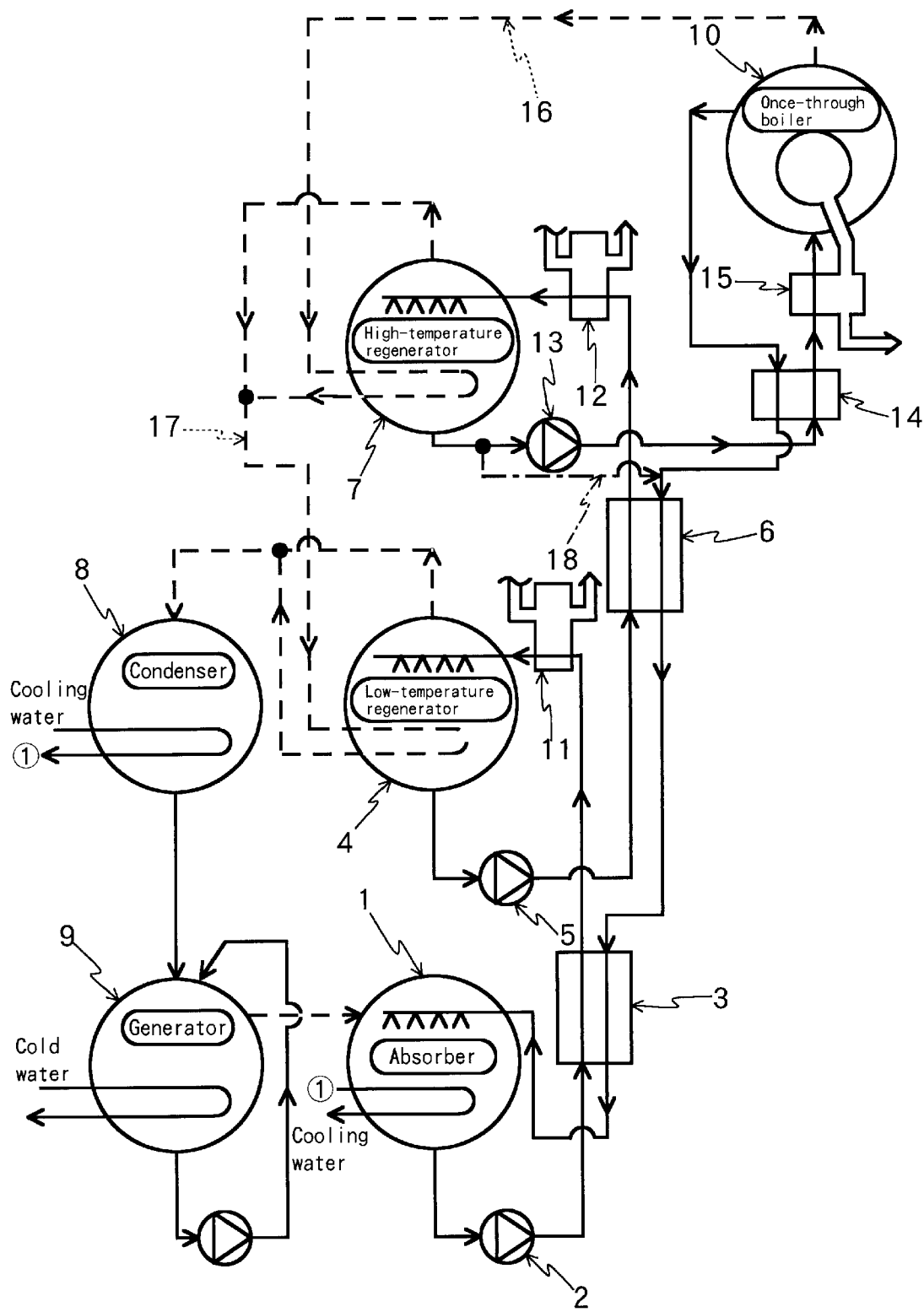
FIG. 9 is a schematic drawing of example 11 of the invention.

The example 11 of the invention is a modification of the example 1. As shown in FIG. 9, cooling water is series-fed from the condenser 8 to the absorber 1 in the reverse of the normal direction.

In this way, the example 11 having such configuration brings about advantages such that the temperature and the pressure of the condenser 8 are lowered as the cooling water of lower temperature is first passed to the condenser 8, causing the temperature and the pressure of the low-temperature regenerator 4 to be lowered, causing the temperature and the pressure of the high temperature regenerator 7 to be lowered and the temperature and the pressure of the boiler system to be lowered, thereby lowering the absorption fluid temperature and concentration and enabling the effective use of low temperature heat sources.

EXAMPLE 12

Figure 10:
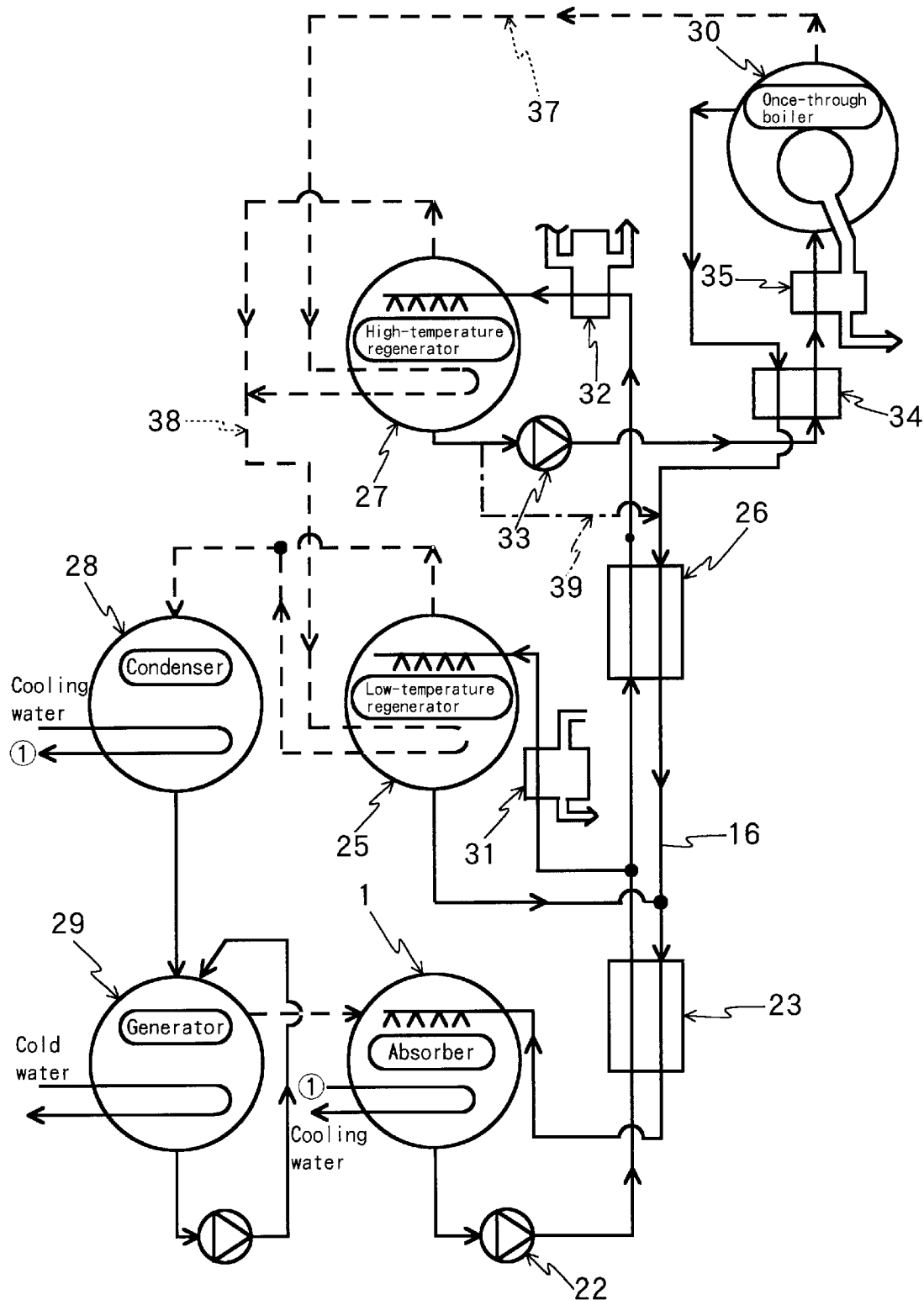
FIG. 10 is a schematic drawing of example 12 of the invention.
Figure 11:
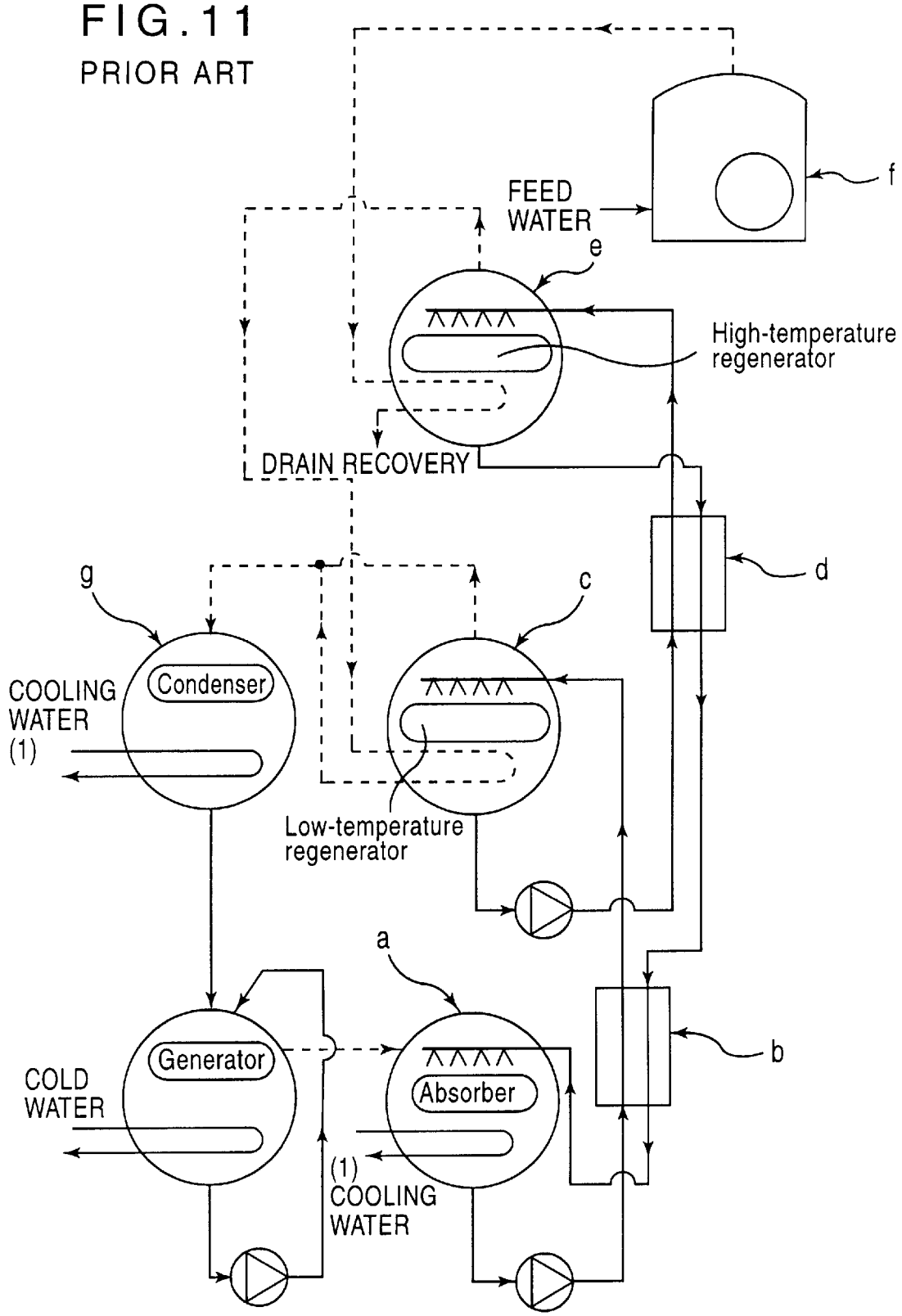
FIG. 11 is a schematic drawing of an absorption refrigerator of conventional reverse cycle type.
Figure 12:
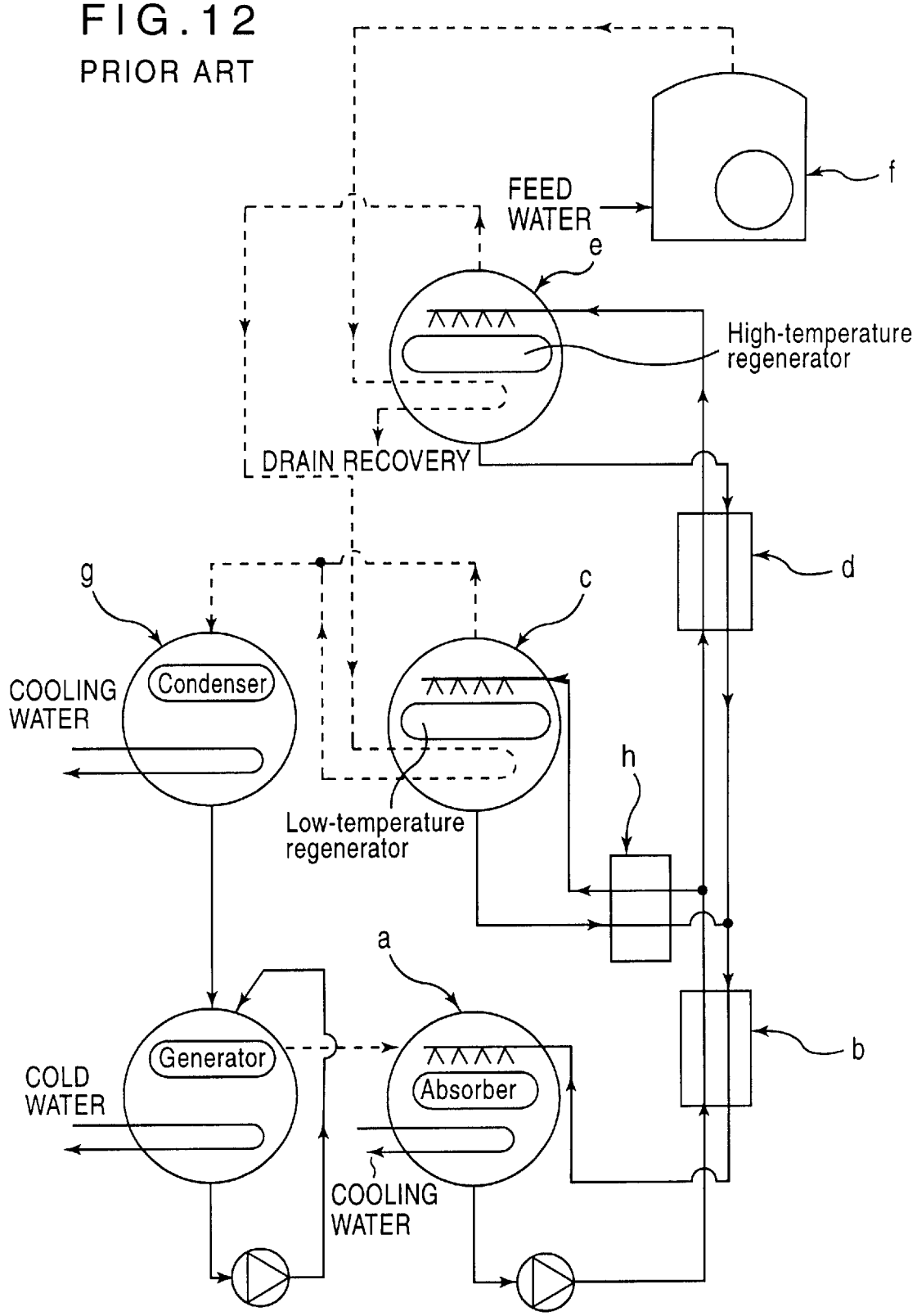
FIG. 12 is a schematic drawing of an absorption refrigerator of conventional parallel cycle type.

The example 12 of the invention is a modification of the example 2. As shown in FIG. 10, cooling water is series-fed from the condenser 28 to the absorber 21 in the reverse of the normal direction.

In this way, the example 12 having such configuration brings about advantages such that the temperature and the pressure of the condenser 28 are lowered since the cooling water of low temperature is first passed to the condenser 28, causing the temperature and the pressure of the low-temperature regenerator 25 to be lowered, the temperature and the pressure of the high-temperature regenerator 27 to be lowered, and the temperature and the pressure of the boiler system to be lowered, thereby lowering the absorption fluid temperature and concentration and enabling the effective use of low temperature heat sources.

EXAMPLE 13

The example 13 of the invention is a modification of the example 1. As shown by chain line in FIG. 1, a part of the concentrated absorption fluid is fed to the once-through boiler 10, and the rest is fed to the heating side of high-temperature heat exchanger 6 by branch of pipe 18. That is, the outlet side of high-temperature regenerator 7 and the inlet side of high-temperature heat exchanger 6 are communicated by the pipe 18. Incidentally, the flow rate at the branch may be controlled by a widely known means such as a flow rate control vale, etc.

In this way, the example 13 having such configuration brings about advantages such that the quantity of lithium bromide fed to the once-through boiler side can be decreased, causing the reduction of heat losses generated at the boiler side, thereby achieving the energy saving purpose by reducing the quantity of heat required.

EXAMPLE 14

The example 14 of the invention is a modification of the example 2. As shown by chain line in FIG. 2, a part of the concentrated absorption fluid is fed to the once-through boiler 30, and the rest is fed to the heating side of high-temperature heat exchanger 26 by branch of pipe 39. That is, the outlet side of high-temperature regenerator 27 and the inlet side of heating side of high-temperature heat exchanger 26 are communicated by the pipe 39. Incidentally, the flow rate at the branch may be controlled by a widely known means such as a flow rate control vale, etc.

In this way, the example 14 having such configuration brings about advantages such that the volume of lithium bromide fed to the once-through boiler side can be decreased, causing the reduction of heat losses generated at the boiler side, thereby achieving the energy saving purpose by reducing the quantity of heat required.

The present invention has been described in accordance with the embodiments and examples, but it is to be understood that the invention is not limited in its application to only these embodiments and examples and that various modifications are possible. For example, in the example 7 or the example 10, it is also possible to provide three or more combinations of absorber 1 and generator 9 instead of two combinations.

POTENTIAL FOR INDUSTRIAL APPLICATION

As described above, an absorption refrigerator of the present invention brings about advantages such that, by combining the absorption refrigerator with a fluid concentrating boiler in the form of one body, it is possible to reduce the quantity of fuel consumed per cooling output as a whole and at the same time to achieve the power and energy saving purpose and further it is possible to make the whole absorption refrigerator small-sized and compact.

Also, when feeding the feed absorption fluid to the fluid concentrating boiler, the boiler efficiency is greatly increased by providing for the feed absorption fluid one or both of the first heat exchanger using the product (highly concentrated absorption fluid) of the fluid concentrating boiler as a heat source and the second heat exchanger using the discharge (combustion exhaust gas) of the fluid concentrating boiler as a heat source, and also it is possible to considerably save power and energy.

Further, by disposing an auxiliary regenerator, of which heating source is the discharge of the fluid concentrating boiler, at the inlet side of absorption fluid to the low-temperature regenerator and/or at the inlet side of absorption fluid to the high-temperature regenerator, the quantity of heat per cooling output that requires external heat may be reduced and it is possible to save power and energy still more.

In addition, by employing a once-through boiler as the fluid concentrating boiler, it is possible to make the whole absorption refrigerator compact and easy to operate, and also to reduce the absorption fluid cost.

What is claimed is:

1. A steam type absorption refrigerator which circulates absorption fluid from an absorber, through a low-temperature heat exchanger, a low-temperature regenerator, a high-temperature heat exchanger, a steam heating type high-temperature regenerator, the high-temperature heat exchanger and the low-temperature heat exchanger in order, back to the absorber comprising, a fluid concentrating boiler which is disposed between the high-temperature regenerator and the high-temperature heat exchanger concentrating the absorption fluid under heat and a feed means which extracts a part or all of the concentrated absorption fluid from the high-temperature regenerator and feeds it to the fluid concentrating boiler, wherein the fluid concentrating boiler is connected to the high-temperature heat exchanger so that the absorption fluid concentrated under heat is returned to the heating side of the high-temperature heat exchanger and is connected to the high-temperature regenerator so that refrigerant steam generated from the absorption fluid at the fluid concentrating boiler is fed as a heating source to the high-temperature regenerator.

2. A steam type absorption refrigerator in which absorption fluid, first fed from an absorber to a low-temperature heat exchanger, is branched into two passages, one leading to a low-temperature regenerator via a medium-temperature heat exchanger and the other leading to a steam heating type high-temperature regenerator via a high-temperature heat exchanger, and the absorption fluid regenerated at the low-temperature regenerator is returned to a heating side of the medium-temperature heat exchanger, while the absorption fluid regenerated at the high-temperature regenerator is returned to the heating side of the high-temperature heat exchanger, and the absorption fluid from the medium-temperature heat exchanger and a high-temperature heat exchanger are joined together and returned to the absorber through the heating side of the low-temperature heat exchanger comprising, a fluid concentrating boiler which is disposed between the high-temperature regenerator and the high-temperature heat exchanger and concentrates the absorption fluid under heat, and a feed means which extracts a part or all of the concentrated absorption fluid from the high-temperature regenerator and feeds the same to the fluid concentrating boiler, wherein the fluid concentrating boiler is connected to the high-temperature heat exchanger so that the absorption fluid concentrated under heat is returned to the heating side of the high-temperature heat exchanger and is connected to the high-temperature regenerator so that refrigerant steam generated from the absorption fluid at the fluid concentrating boiler is fed as a heating source to the high-temperature regenerator.

3. A steam type absorption refrigerator in which absorption fluid, first fed from an absorber to a low-temperature heat exchanger, is branched into two passages, one leading to a low-temperature regenerator and the other leading to a steam heating type high-temperature regenerator via a high-temperature heat exchanger, and the absorption fluid regenerated at the low-temperature regenerator and the absorption fluid regenerated at the high-temperature regenerator and passed through the high-temperature heat exchanger are joined together and returned to the absorber through a heating side of the low-temperature heat exchanger comprising, a fluid concentrating boiler which is disposed between the high-temperature regenerator and the high-temperature heat exchanger and concentrates the absorption fluid under heat, and a feed means which extracts a part or all of the concentrated absorption fluid from the high-temperature regenerator and feeds the same to the fluid concentrating boiler, wherein the fluid concentrating boiler is connected to the high-temperature heat exchanger so that the absorption fluid concentrated under heat is returned to the heating side of the high-temperature heat exchanger and is connected to the high-temperature regenerator so that refrigerant steam generated from the absorption fluid at the fluid concentrating boiler is fed as a heating source to the high-temperature regenerator.

4. The absorption refrigerator of claim 1, 2 or 3, further comprising a first heat exchanger of which heating source is a return absorption fluid returned from the outlet side of the fluid concentrating boiler to the high-temperature heat exchanger, wherein a feed absorption fluid fed from the high-temperature regenerator undergoes heat exchange with the return absorption fluid at the first heat exchanger before being fed to the fluid concentrating boiler.

5. The absorption refrigerator of claim 1, 2 or 3, further comprising a second heat exchanger of which heating source is the combustion exhaust gas of the fluid concentrating boiler, wherein the feed absorption fluid fed from the high-temperature regenerator undergoes heat exchange with the combustion exhaust gas at the second heat exchanger before being fed to the fluid concentrating boiler.

6. The absorption refrigerator of claim 5, wherein the second heat exchanger is an economizer applied to the fluid concentrating boiler, and the feed absorption fluid is heated by the economizer.

7. The absorption refrigerator of claim 1, wherein an auxiliary regenerator of which heating source is the combustion exhaust gas of the fluid concentrating boiler is disposed at the inlet side of the absorption fluid to the low-temperature regenerator in the range from the low-temperature heat exchanger to the low-temperature regenerator, and/or at the inlet side of the absorption fluid to the high-temperature regenerator in the range from the high-temperature heat exchanger to the high-temperature regenerator.

8. The absorption refrigerator of claim 1, 2, 3 or 7, wherein a third heat exchanger that heats rare absorption fluid by using the refrigerant drain of the low-temperature regenerator as a heating source is disposed in parallel with the low-temperature heat exchanger or in series at the outlet side of the absorption fluid of the low-temperature heat exchanger.

9. The absorption refrigerator of claim 1, 2, 3 or 7, wherein a fourth heat exchanger that heats intermediate absorption fluid by using the refrigerant drain of the low-temperature regenerator as a heating source is disposed in parallel with the high-temperature heat exchanger or in series at the outlet side of the absorption fluid of the high-temperature heat exchanger.

10. The absorption refrigerator of claim 1 or 7, wherein a part of the absorption fluid is bypassed from the upstream side of an intermediate fluid feed means to a absorption fluid return line between the high-temperature heat exchanger and the low-temperature heat exchanger.

11. The absorption refrigerator of claim 1, 2, 3 or 7, wherein there is provided a plurality of combinations of absorber and generator, and cold water, cooling water and absorption fluid are series-fed to the plurality of combinations.

12. The absorption refrigerator of claim 1, 2, 3 or 7, wherein there is provided a plurality of combinations of absorber and generator, and cold water and absorption fluid are series-fed to the plurality of combinations and further cooling water is parallel-fed to the plurality of combinations.

13. The absorption refrigerator of claim 1, 2, 3 or 7, wherein cooling water is fed from the condenser to the absorber.

14. The absorption refrigerator of claim 1, 2, 3 or 7, wherein the fluid concentrating boiler is a once-through boiler.

15. The absorption refrigerator of claim 2, wherein an auxiliary regenerator of which heating source is the combustion exhaust gas of the fluid concentrating boiler is disposed at the inlet side of the absorption fluid to the low-temperature regenerator in the range from the medium-temperature heat exchanger to the low-temperature regenerator, and/or at the inlet side of the absorption fluid to the high-temperature regenerator in the range from the high-temperature heat exchanger to the high-temperature regenerator.

16. The absorption refrigerator of claim 3, wherein an auxiliary regenerator of which heating source is the combustion exhaust gas of the fluid concentrating boiler is disposed at the inlet side of the absorption fluid to the low-temperature regenerator in the range from the absorption fluid branch point to the low-temperature regenerator, and/or at the inlet side of the absorption fluid to the high-temperature regenerator in the range from the high-temperature heat exchanger to the high-temperature regenerator.

* * * * *